United States Patent Office 3,383,418
Patented May 14, 1968

3,383,418
PROCESS FOR THE PREPARATION OF 2,2,4-TRIMETHYL-3-KETO-1-PENTANOL
David C. Hull and Sam H. Johnson, Jr., Longview, Tex., assignors to Eastman Kodak Company, Rochester, N.Y., a corporation of New Jersey
No Drawing. Filed Jan. 17, 1966, Ser. No. 520,912
4 Claims. (Cl. 260—594)

ABSTRACT OF THE DISCLOSURE

A process for preparing 2,2,4-trimethyl-3-keto-1-pentanol which comprises dehydrogenating 2,2,4 - trimethylpentane-1,3-diol monoisobutyrate in the liquid phase over a Raney nickel catalyst. The 2,2,4-trimethyl-3-keto-1-pentanol is particularly useful as a solvent and as an intermediate, for example, for plasticizers.

---

This invention relates to a novel keto alcohol and a method for preparing the same. The compound of this invention is particularly useful as a solvent, as an intermediate for plasticizers and as an important intermediate for certain pharmaceuticals.

More particularly this invention relates to 2,2,4-trimethyl-3-keto-1-pentanol and a novel method for preparing this compound. This compound is prepared, according to this invention, by a process of dehydrogenating 2,2,4 - trimethylpentane-1,3-diol monoisobutyrate in the liquid phase. The catalyst used for dehydrogenating is a Raney nickel catalyst.

Raney nickel catalysts are well known and widely used as hydrogenation catalysts. In addition, Raney nickel has been found to have dehydrogenation properties as well. The Raney nickel catalyst, however, is unlike the other metal dehydrogenation catalysts in that the nickel catalyst converts an ester group to an alcohol group. For example, the use of a copper chromite as a dehydrogenation catalyst with 2,2,4-trimethylpentane-1,3-diol monoisobutyrate gave 2,2,4 - trimethyl-3-keto-1-pentanol monoisobutyrate. When a milder catalyst such as zinc oxide was used, the resultant product was diisopropyl ketone. Thus other metal dehydrogenation catalysts are not suitable.

The reaction of the present invention may be shown schematically as follows:

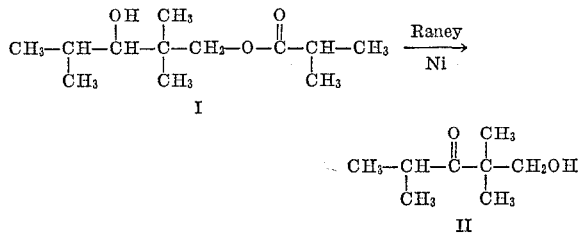

This reaction is conducted at a temperature range of 150–200° C. and at a pressure of from 5–50 mm., a preferred range being a temperature of 165–170° C. and a pressure of 7–10 mm.

The following example will readily serve to illustrate the novel compound and method of preparation which are the subject of this invention.

Example

A 2019 g. portion of 2,2,4 - trimethylpentane-1,3-diol monoisobutyrate and a 170 g. portion of Raney nickel catalyst were placed in a 3000 ml. flask. The Raney nickel catalyst had previously been prepared by washing with ethyl alcohol to remove any water. The flask containing the mixture was then placed on a 30-plate distillation column. During distillation, at a pressure of 7–10 mm., the base temperature was 165–170° C. The take off rate of the column was set at 10%. A total of 1600 g. of distillate was collected. A further distillation of this fraction yielded 892 g. of 2,2,4-trimethyl-3-keto-1-pentanol, having a boiling point of 102–105° C. at 20 mm.

Although Raney nickel may be used in vapor phase as well as liquid phase reactions, only liquid phase reaction has been found applicable in this invention. In the vapor phase, the 2,2,4-trimethyl-3-keto-1-pentanol reaction product (II) is broken down to isobutyraldehyde and other undesired low boiling products. As seen from the example above, the present process must be run under reduced pressure. The purpose of running at reduced pressure is to remove the 2,2,4 - trimethyl-3-keto-1-pentanol product (II) from the presence of the catalyst as the product is formed. By so removing, further breakdown of the desired product is prevented.

The above example readily illustrates that by our novel process we obtain a result not expected with the particular dehydrogenation catalyst. In our process we get ester interchange and obtain a keto alcohol rather than a keto ester. As also seen above, other dehydrogenation catalysts such as copper chromite and zinc oxide do not give the result obtained by our present process.

Although this invention has been described in detail with particular reference to a certain preferred embodiment thereof, it will be understood that variations and modifications can be effected within the spirit and scope of the invention as described hereinabove, and as defined in the appended claims.

We claim:
1. The process for the production of 2,2,4-trimethyl-3-keto-1-pentanol which comprises contacting 2,2,4-trimethylpentane - 1,3-diol monoisobutyrate in the liquid phase with a Raney nickel catalyst at a temperature of 150°–200° C. under a pressure of 5–50 mm. and recovering the keto alcohol.
2. The process of claim 1 wherein the temperature is 165–170° C.
3. The process of claim 2 wherein the pressure is 7–10 mm.
4. The process for the production of 2,2,4-trimethyl-3-keto-1-pentanol which comprises contacting 2,2,4-trimethylpentane - 1,3-diol monoisobutyrate in the liquid phase with Raney nickel at a temperature of 165–170° C., a pressure of 7–10 mm., and recovering the keto alcohol.

References Cited

UNITED STATES PATENTS 2,173,114   9/1939   Howk _____ 260—594

OTHER REFERENCES

Weissberger: Cat. Photochem, Electrolytic Reactions," pages 121 to 124 (1956).
Nazarov et al.: "Chem. Abst.," vol. 50, col. 3437f (1956).

BERNARD HEFLIN, Acting Primary Examiner.
LEON ZITVER, Examiner.
M. JACOB, Assistant Examiner.

UNITED STATES PATENT OFFICE
CERTIFICATE OF CORRECTION

Patent No. 3,383,418                      May 14, 1968

David C. Hull et al.

It is certified that error appears in the above identified patent and that said Letters Patent are hereby corrected as shown below:

Column 2, line 44, "The process of claim 2" should read -- The process of claim 1 --.

Signed and sealed this 14th day of October 1969.

(SEAL)
Attest:

Edward M. Fletcher, Jr.                    WILLIAM E. SCHUYLER, JR.
Attesting Officer                          Commissioner of Patents